United States Patent
Hirano et al.

(10) Patent No.: US 11,891,569 B2
(45) Date of Patent: Feb. 6, 2024

(54) DIVERTING AGENT AND METHOD OF FILLING FRACTURE IN WELL USING THE SAME

(71) Applicant: Mitsubishi Chemical Corporation, Tokyo (JP)

(72) Inventors: Yasuhiro Hirano, Tokyo (JP); Ryosuke Taniguchi, Tokyo (JP); Chizuko Furo, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 17/397,336

(22) Filed: Aug. 9, 2021

(65) Prior Publication Data

US 2021/0363413 A1    Nov. 25, 2021

Related U.S. Application Data

(63) Continuation of application No. PCT/JP2020/005304, filed on Feb. 12, 2020.

(30) Foreign Application Priority Data

Feb. 13, 2019    (JP) ................................ 2019-023949

(51) Int. Cl.
  *C09K 8/68*    (2006.01)
  *C09K 8/70*    (2006.01)
  *E21B 43/267*    (2006.01)

(52) U.S. Cl.
  CPC .................. *C09K 8/68* (2013.01); *C09K 8/70* (2013.01); *E21B 43/267* (2013.01)

(58) Field of Classification Search
  CPC .......... C09K 8/516; C09K 8/508; C09K 8/68; C09K 8/70; C09K 8/035; C09K 8/5083; C09K 8/92; C09K 8/88; C09K 8/426; C09K 8/487; E21B 33/138; E21B 43/26; E21B 33/13; E21B 43/16; E21B 43/261; E21B 43/267
  See application file for complete search history.

(56) References Cited

U.S. PATENT DOCUMENTS

| | | | |
|---|---|---|---|
| 2016/0298017 A1 | 10/2016 | Takahashi et al. | |
| 2017/0253703 A1 | 9/2017 | Yoshikawa et al. | |
| 2018/0010037 A1 | 1/2018 | Yoshikawa et al. | |
| 2020/0317985 A1* | 10/2020 | Fujita | C09K 8/88 |

FOREIGN PATENT DOCUMENTS

| | | |
|---|---|---|
| CN | 103725277 A | 4/2014 |
| CN | 105441047 A | 3/2016 |
| CN | 106350043 A | 1/2017 |
| CN | 107286916 A | 10/2017 |
| CN | 107629774 A | 1/2018 |
| CN | 111527182 A | 8/2020 |
| EP | 3733811 | 11/2020 |
| EP | 3904396 | 11/2021 |
| JP | 2016-56272 A | 4/2016 |
| JP | 2016-147971 A | 8/2016 |
| JP | 2016-147972 A | 8/2016 |
| WO | 2015/072317 A1 | 5/2015 |
| WO | 2018/231236 A1 | 12/2018 |

OTHER PUBLICATIONS

CN-107286916-A, Text translation. (Year: 2017).*
ISR issued in WIPO Patent Application No. PCT/JP2020/005304, May 12, 2020, English translation.
Written Opinion issued in WIPO Patent Application No. PCT/JP2020/005304, dated May 12, 2020, English translation.
IPRP issued in WIPO Patent Application No. PCT/JP2020/005304, Aug. 10, 2021, English translation.
European Search Report issued with respect to European application No. 20756458.4, dated Mar. 9, 2022.
Office Action issued in CN Patent Application No. 2020800132606, Nov. 28, 2022, translation.
Office Action issued in CN Patent Application No. 202080013260.6, dated Jun. 22, 2023, translation.

* cited by examiner

*Primary Examiner* — Zakiya W Bates
(74) *Attorney, Agent, or Firm* — GREENBLUM & BERNSTEIN P.L.C.

(57) ABSTRACT

A diverting agent is provided which has solubility in water that can be controlled excellently and which does not easily dissolve at an early stage of filling of fractures in a well in excavation method using a hydraulic fracturing method and dissolves in water and can be easily removed after filling is no longer needed. The diverting agent contains powdery polyvinyl alcohol-based resins having an average particle diameter of 800 to 2000 μm.

6 Claims, No Drawings

DIVERTING AGENT AND METHOD OF FILLING FRACTURE IN WELL USING THE SAME

CLAIM FOR PRIORITY

This application is a Continuation of PCT/JP2020/005304 filed Feb. 12, 2020, and claims the priority benefit of Japanese application 2019-023949 filed Feb. 13, 2019, the contents of which are expressly incorporated by reference herein in their entireties.

TECHNICAL FIELD

The present invention relates to a diverting agent and a method of filling a fracture in a well using the diverting agent. More specifically, the invention relates to a diverting agent employed at the time of construction of excavation method using a hydraulic fracturing method and a method of filling a well fracture using the diverting agent.

BACKGROUND ART

For collecting petroleum or other underground resources, a hydraulic fracturing method in which high-pressure water is injected into an underground shale layer to cause fractures is widely adopted. In the hydraulic fracturing method, first, a vertical hole (vertical well) with a depth of several thousand meters below ground is excavated vertically by a drill, and then, when the vertical hole reaches the shale layer, a horizontal hole (horizontal well) with a diameter of ten to several tens of centimeters is excavated horizontally. By filling the vertical well and the horizontal well with fluid and pressurizing the fluid, fractures are generated from the well. Natural gas, petroleum (shale gas/oil) or the like in the shale layer flows out from the fractures and is collected. According to such a method, a resource inflow cross-section of wells can be increased by generation of fractures, and underground resources can be efficiently collected.

In the hydraulic fracturing method described above, prior to generation of fractures due to fluid pressurization, preliminary blasting called perforation is performed in a horizontal well. By such preliminary blasting, perforations are made from the well to a production layer. After that, by injecting the fracturing fluid into the well, the fluid flows into these perforations, and a load is applied to the perforations. Then, fractures are generated in these perforations and grow into fractures in a size suitable for resource collection.

In the hydraulic fracturing method, a part of fractures that has already been generated is temporarily filled with an additive called a diverting agent in order to grow fractures that have already been generated larger or to generate more fractures. By temporarily filling a part of the fractures with the diverting agent and pressurizing the fracturing fluid filled in the well in the state, fluid may enter into the other fractures, so that other fractures can grow large or new fractures can be generated.

Since the diverting agent is used to temporarily fill the fractures as described above, a diverting agent which can maintain the shape for a certain period of time and disappears by hydrolysis when natural gas, petroleum or the like is collected is used. For example, various techniques in which a hydrolyzable resin such as polyglycolic acid (PGA) or polylactic acid (PLA) is used as a divergent agent have been proposed.

PTL 1 has proposed a temporary sealing agent for use in well boring which contains polyglycolic acid having high biodegradability among biodegradable aliphatic polyester-based resins.

PTL 2 has proposed a powder containing particles of polylactic acid which is a biodegradable resin in which 50 mass % or more of particles do not pass through a sieve having an opening of 500 μm and in which the particles have an angle of repose of 51 degrees or more.

Furthermore, PTL 3 has proposed hydrolyzable particles having a dispersion structure in which fine particles of a polyoxalate having a high biodegradability for adjusting the degree of hydrolysis of the polylactic acid are distributed in polylactic acid and having an average particle size ($D_{50}$) of 300 to 1000 μm and a roundness in which a minor axis/major axis ratio is 0.8 or more.

Moreover, PTL 4 has proposed polyoxalate particles having an average particle diameter ($D_{50}$) in the range of 300 to 1000 μm and a roundness in which a minor axis/major axis ratio is 0.8 or more.

CITATION LIST

Patent Literature

PTL 1: WO 2015/072317
PTL 2: JP-A-2016-56272
PTL 3: JP-A-2016-147971
PTL 4: JP-A-2016-147972

SUMMARY OF INVENTION

Technical Problem

Some of the places for resource collection are at a low temperature of 40 to 60° C., and there has been a problem because the biodegradation rate of polyglycolic acid, polylactic acid or the like is low in such a low temperature region, it takes a long time for the removal.

Even using a material which easily dissolves in water, when the dissolution rate is too high, sufficient filling may not be maintained during the hydraulic fracturing method even after fractures have been once filled.

Therefore, a problem of the invention is to provide a diverting agent which has solubility in water that can be controlled excellently and which does not easily dissolve at an early stage of filling of fractures in a well in excavation method using a hydraulic fracturing method and dissolves in water and can be easily removed after filling is no longer needed.

Solution to Problem

The present inventors have made intensive studies and have found, as a result, that powdery polyvinyl alcohol-based resins having an average particle diameter in the range of 800 to 2000 μm can inhibit the initial dissolution in water after addition but dissolves mostly after a certain period of time (for example, after seven days). The invention has been thus completed.

That is, the invention is characterized by the following (1) to (6).

(1) A diverting agent containing powdery polyvinyl alcohol-based resins having an average particle diameter of 800 to 2000 μm.

(2) The diverting agent according to (1) above, wherein, when 1 g of the polyvinyl alcohol-based resins is immersed in 100 g of water at 23° C. for an hour, the residual rate of the polyvinyl alcohol-based resins is 50 mass % or more.

(3) The diverting agent according to (1) or (2) above, wherein, when 1 g of the polyvinyl alcohol-based resins is immersed in 100 g of water at 40° C. for seven days, the residual rate of the polyvinyl alcohol-based resins is 10 mass % or less.

(4) The diverting agent according to any one of (1) to (3) above, wherein the degree of saponification of the polyvinyl alcohol-based resin is 90 to 100 mol %.

(5) The diverting agent according to any one of (1) to (4) above, wherein the polyvinyl alcohol-based resin is a polyvinyl alcohol-based resin having a hydrophilic modifying group.

(6) A method of filling a fracture in a well which is a method of temporarily filling the fracture generated in the well including allowing the diverting agent according to any one of (1) to (5) above to flow into the fracture with a flow of fluid in the well.

Advantageous Effects of Invention

The diverting agent of the invention contains water-soluble polyvinyl alcohol-based resin powder, and the average particle diameter of the polyvinyl alcohol-based resin powder is 800 to 2000 μm. Although the solubility in water of the polyvinyl alcohol-based resin powder is low at an early stage after addition (which means that the residual rate after dissolution in water is high), the polyvinyl alcohol-based resin powder dissolves and can be eliminated mostly after a certain period of time (for example, after seven days). Accordingly, the diverting agent of the invention has sufficient capability of filling fractures in a well but dissolves in water and is removed easily after filling.

Therefore, the diverting agent of the invention can be preferably used in a hydraulic fracturing method employed in excavation operation of natural gas, petroleum or the like.

DESCRIPTION OF EMBODIMENTS

Although the invention is described in detail below, these are desired and exemplary embodiments, and the invention is not specified by these contents.

Here, the term "polyvinyl alcohol" is sometimes simply referred to as "PVA".

In the present specification, (meth)allyl means allyl or methallyl, and (meth)acryl means acryl or methacryl. (Meth)acrylate means acrylate or methacrylate.

Moreover, in the present specification, "mass" is synonymous with "weight".

The diverting agent of the invention contains powdery polyvinyl alcohol-based resins having an average particle diameter of 800 to 2000 μm.

[PVA-Based Resin]

The PVA-based resin used in the invention is a resin mainly having a vinyl alcohol structural unit obtained by saponifying a polyvinyl ester-based resin obtained by polymerizing a vinyl ester monomer and has a vinyl alcohol structural unit corresponding to the degree of saponification and a vinyl acetate structural unit of an unsaponified portion.

In the invention, as the PVA-based resin, a modified PVA-based resin obtained by copolymerizing various monomers during the production of a polyvinyl ester-based resin and saponifying the copolymer, a variety of post-modified PVA-based resins obtained by introducing various functional groups into an unmodified PVA-based resin by post-modification and the like can be used in addition to an unmodified PVA-based resin. Such modification can be performed as long as the water solubility of the PVA-based resin is not lost. In some cases, the modified PVA-based resin may be further post-modified.

The PVA-based resin used in the invention is in powdery form, and the average particle diameter is 800 to 2000 μm. In the invention, "powdery" means finely pulverized small granules which have an average particle diameter in the range of 800 to 2000 μm through pulverization or crushing.

When the average particle diameter of the PVA-based resins is 800 μm or more, the initial dissolution rate when added to water can be moderately decreased, while the PVA-based resins can be dissolved and removed in about a week also in an aqueous solution at a low temperature of 40 to 60° C. when the average particle diameter is 2000 μm or less. The average particle diameter is preferably 850 to 1800 more preferably 880 to 1500 μm because the balance between the solubility (initial solubility) after adding the PVA-based resins to the diverting agent, charging into fractures in a well and filling the fractures and the solubility (later solubility) after a certain period of time (for example, after seven days) when filling of the fractures is no longer needed can be controlled easily.

The average particle diameter can be measured by the method of the dry sieving test method (refer to JIS Z 8815: 1994). In the present specification, the particle diameter is a particle diameter at which the integrated value (cumulative distribution) is 50% when a volume distribution for each particle diameter is measured by the dry sieving test method.

The shape of the PVA-based resin powder is not particularly limited, but examples thereof include a spherical shape, an ellipse shape, a polygonal shape, an irregular form and the like.

With respect to the PVA-based resin used in the invention, when 1 g of the PVA-based resins is immersed in 100 g of water at 23° C. for an hour, the residual rate is preferably 50 mass % or more. The diverting agent is generally dispersed in water at normal temperature to room temperature before use. Therefore, evaluation in accordance with actual use can be made using water at 23° C. When the residual rate of the PVA-based resins after immersing 1 g of the PVA-based resins in 100 g of water at 23° C. for an hour is 50 mass % or more, the initial solubility is low, and thus the PVA-based resin can exhibit excellent capability of filling gaps such as fractures in a well. The residual rate after immersion in water at 23° C. for an hour is more preferably 52 to 95 mass %, further preferably 52 to 90 mass %.

With respect to the PVA-based resin used in the invention, when 1 g of the PVA-based resins is immersed in 100 g of water at 40° C. for seven days, the residual rate is preferably 10 mass % or less. The temperatures of some regions in a well are 40 to 60° C., and the temperature of a dispersing liquid of the diverting agent gradually increases when the dispersing liquid is charged into a well. Therefore, evaluation in accordance with actual use can be made using water at 40° C. When the residual rate of the PVA-based resins after immersing 1 g of the PVA-based resins in 100 g of water at 40° C. for seven days is 10 mass % or less, the solubility is excellent, and thus the PVA-based resins are rapidly removed after filling gaps such as fractures in a well. The residual rate after immersion in water at 40° C. for seven days is more preferably 0 to 9 mass %, further preferably 0 to 8 mass %.

The solubility of the PVA-based resin upon immersion in water at 23° C. or 40° C. can be controlled by adjusting the average degree of polymerization, the degree of saponification, the melting point, the heat treatment or the like as well as the average particle diameter or by adjusting by modification with a functional group or the like.

The average degree of polymerization (measured in accordance with JIS K 6726: 1994) of the PVA-based resins used in the invention is preferably 200 to 3000. When the average degree of polymerization of the PVA-based resins is in the range, the dissolution rate can be made within an adequate range, and thus the dissolution behavior can be easily controlled. In view of the balance between the filling capability and the later solubility, the average degree of polymerization is preferably 300 to 2500, more preferably 400 to 2000.

The degree of saponification (measured in accordance with JIS K 6726: 1994) of the PVA-based resin is preferably 90 to 100 mol %. When the degree of saponification is too low, the water solubility tends to decrease. In view of the capability of filling gaps such as fractures, the degree of saponification is more preferably 92 to 99.9 mol %, further preferably 94 to 99.5 mol %.

The melting point of the PVA-based resin is preferably 140 to 250° C., more preferably 150 to 245° C., further preferably 160 to 240° C., particularly preferably 170 to 230° C.

Here, the melting point is a value measured by a differential scanning calorimeter (DSC) at a temperature raising/decreasing rate of 10° C./min.

The 4 mass % aqueous solution viscosity of the PVA-based resin is preferably 2 to 80 mPa·s, more preferably 3 to 70 mPa·s, further preferably 4 to 60 mPa·s, particularly preferably 4 to 40 mPa·s. There is a tendency towards difficulty in obtaining the effects of the present application when the viscosity is too low while the production tends to be difficult when the viscosity is too high.

Here, the 4 mass % aqueous solution viscosity of the PVA-based resin is the viscosity at 20° C. of a 4 mass % aqueous solution of the PVA-based resin measured in accordance with JIS K6726: 1994.

In the invention, a modified PVA-based resin in which a functional group has been introduced may be used as the PVA-based resin, and examples thereof include a hydrophilic modifying group-containing PVA-based resin, an ethylene-modified PVA-based resin and the like. Of these, a hydrophilic modifying group-containing PVA-based resin is preferred. Examples of the hydrophilic modifying group include hydroxyl group, carboxyl group, amino group and the like.

In particular, a PVA-based resin having a primary hydroxyl group in a side chain thereof is preferred in view of the excellent melt forming property. The number of the primary hydroxyl groups in the PVA-based resin having a primary hydroxyl group in a side chain thereof is preferably 1 to 5, more preferably 1 or 2, particularly preferably 1. The PVA-based resin preferably has a secondary hydroxyl group in addition to the primary hydroxyl group.

Examples of the PVA-based resin having a primary hydroxyl group in a side chain thereof include a modified PVA-based resin having a 1,2-diol structural unit in a side chain thereof, a modified PVA-based resin having a hydroxyalkyl group structural unit in a side chain thereof and the like. Of these examples, in particular, a modified PVA-based resin containing a 1,2-diol structural unit in a side chain thereof represented by the following general formula (1) (sometimes referred to as "side-chain 1,2-diol structural unit-containing modified PVA-based resin" below) is preferably used.

As in general PVA-based resins, the portions other than the 1,2-diol structural unit are a vinyl alcohol structural unit and a vinyl ester structural unit of an unsaponified portion.

[Chem. 1]

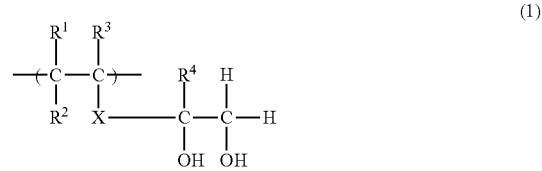

(1)

(In the formula (1), $R^1$ to $R^4$ each independently represent a hydrogen atom or an alkyl group having 1 to 4 carbon atoms, and X represents a single bond or a bond chain.)

In the general formula (1) above, $R^1$ to $R^4$ each independently represent a hydrogen atom or an alkyl group having 1 to 4 carbon atoms. All of $R^1$ to $R^4$ are desirably hydrogen atoms but may be an alkyl group having 1 to 4 carbon atoms as long as the amount thereof does not remarkably impair the resin characteristics. The alkyl group is not particularly limited, but preferred examples thereof include a methyl group, an ethyl group, an n-propyl group, an isopropyl group, an n-butyl group, an isobutyl group, a tert-butyl group and the like. The alkyl group may have a substituent such as a halogeno group, a hydroxyl group, an ester group, a carboxylic acid group and a sulfonic acid group when necessary.

In the general formula (1) above, X is a single bond or a bond chain. X is preferably a single bond in terms of thermal stability and stability at a high temperature or under acidic conditions but may be a bond chain as long as the effects of the invention are not impaired.

The bond chain is not particularly limited, and in addition to a hydrocarbon group such as an alkylene group, an alkenylene group, an alkynylene group, a phenylene group and a naphthylene group (the hydrocarbon groups may be substituted with a halogen atom such as fluorine atom, chlorine atom and bromine atom or the like), examples include —O—, —(CH$_2$O)$_m$—, —(OCH$_2$)$_m$—, —(CH$_2$O)$_m$CH$_2$—, —CO—, —COCO—, —CO(CH$_2$)$_m$CO—, —CO(C$_6$H$_4$)CO—, —S—, —CS—, —SO—, —SO$_2$—, —NR—, —CONR—, —NRCO—, —CSNR—, —NRCS—, —NRNR—, —HPO$_4$—, —Si(OR)$_2$—, —OSi(OR)$_2$—, —OSi(OR)$_2$O—, —Ti(OR)$_2$—, —OTi(OR)$_2$—, —OTi(OR)$_2$O—, —Al(OR)—, —OAl(OR)—, —OAl(OR)O— and the like. R's each independently are a hydrogen atom or an optional substituent, and a hydrogen atom or an alkyl group (particularly an alkyl group having 1 to 4 carbon atoms) is preferred. In addition, m is a natural number, preferably 1 to 10, particularly preferably 1 to 5. Of these examples, the bond chain is preferably an alkylene group having 6 carbon atoms or less, particularly preferably a methylene group or —CH$_2$OCH$_2$—, in terms of viscosity stability, heat resistance and the like during production.

In a particularly preferred structure of the 1,2-diol structural unit represented by the general formula (1) above, all of $R^1$ to $R^4$ are hydrogen atoms, and X is a single bond.

When the PVA-based resin is a modified PVA-based resin, the modification rate in the modified PVA-based resin, namely, the amount of the structural units derived from various monomers in the copolymer or the functional group introduced by the post reaction is preferably 0.1 to 20 mol %, although the amount does not always apply because the characteristics vary largely with the kind of the functional group.

For example, when the PVA-based resin is a hydrophilic modifying group-containing PVA-based resin, the modification rate is preferably 0.1 to 20 mol %, more preferably 0.5 to 10 mol %, further preferably 1 to 8 mol %, particularly preferably 1 to 3 mol %. Fractures in a well cannot be temporarily filled when the modification rate is too high while the solubility after a certain period of time tends to deteriorate when the modification rate is too low.

The 1,2-diol structural unit content (modification rate) of the PVA-based resin can be determined from the $^1$H-NMR spectrum (solvent, DMSO-$d_6$; internal standard, tetramethylsilane) of the PVA-based resin having a degree of saponification of 100 mol %. Specifically, the content can be calculated from the peak area derived from a hydroxyl proton, a methine proton and a methylene proton in the 1,2-diol structural unit, a methylene proton in the main chain, a proton of a hydroxyl group linked to the main chain or the like.

When the PVA-based resin is an ethylene-modified PVA-based resin, the modification rate is preferably 0.1 to 15 mol %, more preferably 0.5 to 10 mol %, further preferably 1 to 10 mol %, particularly preferably 5 to 9 mol %. The water solubility tends to decrease when the modification rate is too high while melt forming tends to be difficult when the modification rate is too low.

An example of the method for producing the PVA-based resin used in the invention is a production method by polymerizing a vinyl ester monomer and saponifying the obtained polyvinyl ester polymer.

Examples of the vinyl ester monomer include vinyl acetate, vinyl propionate, vinyl butyrate, vinyl caproate, vinyl caprylate, vinyl caprate, vinyl laurate, vinyl myristate, vinyl palmitate, vinyl stearate, vinyl cyclohexanecarboxylate, vinyl pivalate, vinyl octylate, vinyl monochloroacetate, vinyl adipate, vinyl methacrylate, vinyl crotonate, vinyl sorbate, vinyl benzoate, vinyl cinnamate, vinyl trifluoroacetate and the like, and vinyl acetate is preferably used in view of the price and the availability.

Examples of the monomer used for the copolymerization with the vinyl ester monomer in the production of a vinyl ester-based resin include olefins such as ethylene, propylene, isobutylene, α-octene, α-dodecene and α-octadecene; unsaturated acids such as acrylic acid, methacrylic acid, crotonic acid, maleic acid, maleic anhydride and itaconic acid, a salt thereof, a mono- or di-alkyl ester thereof or the like; nitriles such as acrylonitrile and methacrylonitrile; amides such as acrylamide and methacrylamide; olefin sulfonic acid such as ethylene sulfonic acid, allyl sulfonic acid and methallyl sulfonic acid or a salt thereof; alkyl vinyl ethers; N-acrylamide methyltrimethylammonium chloride; allyl trimethylammonium chloride; dimethylallyl vinyl ketone; N-vinyl pyrrolidone; vinyl chloride; vinylidene chloride; polyoxyalkylene (meth)allyl ether such as polyoxyethylene (meth)allyl ether and polyoxypropylene (meth)allyl ether; polyoxyalkylene (meth)acrylate such as polyoxyethylene (meth)acrylate and polyoxypropylene (meth)acrylate; polyoxyalkylene (meth)acrylamide such as polyoxyethylene (meth)acrylamide and polyoxypropylene (meth)acrylamide; polyoxyethylene [1-(meth)acrylamide-1, 1-dimethylpropyl] ester; polyoxyalkylene vinyl ether such as polyoxyethylene vinyl ether and polyoxypropylene vinyl ether; polyoxyalkylene allylamine such as polyoxyethylene allylamine and polyoxypropylene allylamine; polyoxyalkylene vinylamine such as polyoxyethylene vinylamine and polyoxypropylene vinylamine; and a hydroxy group-containing α-olefin such as 3-buten-1-ol, 4-penten-1-ol and 5-hexen-1-ol or a derivative thereof such as an acylated product thereof.

In addition, examples thereof include a compound having a diol such as 3,4-dihydroxy-1-butene, 3,4-diacyloxy-1-butene, 3-acyloxy-4-hydroxy-1-butene, 4-acyloxy-3-hydroxy-1-butene, 3,4-diacyloxy-2-methyl-1-butene, 4,5-dihydroxy-1-pentene, 4,5-diacyloxy-1-pentene, 4,5-dihydroxy-3-methyl-1-pentene, 4,5-diacyloxy-3-methyl-1-pentene, 5,6-dihydroxy-1-hexene, 5,6-diacyloxy-1-hexene, glycerin monoallyl ether, 2,3-diacetoxy-1-allyloxypropane, 2-acetoxy-1-allyloxy-3-hydroxypropane, 3-acetoxy-1-allyloxy-2-hydroxypropane, glycerin monovinyl ether, glycerin monoisopropenyl ether, vinylethylene carbonate and 2,2-dimethyl-4-vinyl-1,3-dioxolane and the like.

The polymerization of a vinyl ester monomer or the polymerization of a vinyl ester monomer and a copolymerization monomer can be conducted by any known polymerization method such as solution polymerization, suspension polymerization and emulsion polymerization. Of these, solution polymerization, which can efficiently remove the heat of reaction, is preferably conducted under reflux.

Examples of the solvent used in the polymerization include aliphatic alcohols having 1 to 4 carbon atoms such as methanol, ethanol, isopropyl alcohol, n-propanol and butanol, ketones such as acetone and methylethylketone and the like, and a lower alcohol having 1 to 3 carbon atoms is preferably used.

For the saponification of the obtained polymer, a known conventional saponification method which has been conducted can be employed. That is, the polymer in the state of being dissolved in an alcohol or in a water/alcohol solvent can be saponified using an alkali catalyst or an acid catalyst.

As the alkali catalyst, for example, a hydroxide or an alcoholate of an alkali metal such as potassium hydroxide, sodium hydroxide, sodium methylate, sodium ethylate, potassium methylate and lithium methylate can be used.

Of these, ester exchange reaction using an alkali catalyst in an absolute alcohol-based solvent is preferably used in view of the reaction speed or because the impurities such as fatty acid salts can be reduced.

The reaction temperature of the saponification reaction is preferably 20 to 60° C. There is a tendency towards a decrease in the reaction speed and reduction in the reaction efficiency when the reaction temperature is too low while the temperature sometimes becomes the boiling point of the reaction solvent or higher and the safety in the production tends to decrease when the reaction temperature is too high. In the case of saponification under a high pressure using a column continuous saponification tower having high pressure resistance or the like, saponification at a higher temperature, for example at 80 to 150° C., is possible, and a PVA-based resin having a high saponification degree can be obtained in a short time using even a small amount of a saponification catalyst.

The side-chain 1,2-diol structural unit-containing modified PVA-based resin can be produced by a known production method. For example, the PVA-based resin can be produced by the methods described in JP-A-2002-284818, JP-A-2004-285143 and JP-A-2006-95825. That is, the PVA-based resin can be produced by (i) a method of saponifying a copolymer of a vinyl ester monomer and a compound represented by the following general formula (2), (ii) a method of saponifying and decarboxylation of a copolymer of a vinyl ester monomer and a vinylethylene carbonate represented by the following general formula (3), (iii) a method of saponifying and deketalizing a copolymer of a vinyl ester monomer and a 2,2-dialkyl-4-vinyl-1,3-dioxolane represented by the following general formula (4) or the like.

[Chem. 2]

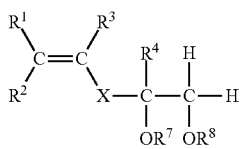

(2)

(In the formula (2), $R^1$ to $R^4$ each independently represent a hydrogen atom or an alkyl group having 1 to 4 carbon atoms, and X represents a single bond or a bond chain. $R^7$ and $R^8$ each independently represent a hydrogen atom or $R^9$—CO— (in the formula, $R^9$ is an alkyl group having 1 to 4 carbon atom).)

[Chem. 3]

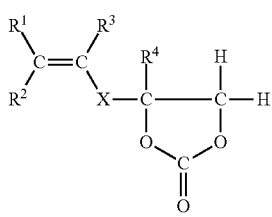

(3)

(In the formula (3), $R^1$ to $R^4$ each independently represent a hydrogen atom or an alkyl group having 1 to 4 carbon atoms, and X represents a single bond or a bond chain.)

[Chem. 4]

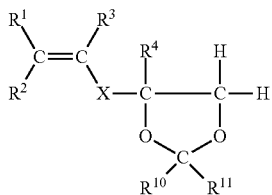

(4)

(In the formula (4), $R^1$ to $R^4$ each independently represent a hydrogen atom or an alkyl group having 1 to 4 carbon atoms, and X represents a single bond or a bond chain. $R^{10}$ and $R^{11}$ each independently represent a hydrogen atom or an alkyl group having 1 to 4 carbon atoms.)

Specific examples and preferred examples of $R^1$ to $R^4$ and X in the formula (2) to the formula (4) are the same as those of the formula (1) above, and specific examples and preferred examples of the alkyl group having 1 to 4 carbon atoms of $R^7$ to $R^{11}$ are the same as those in the formula (1).

Of the methods (i) to (iii), the method (i) is preferred in that copolymerization reactivity and industrial handling are excellent. In particular, the compound represented by the general formula (2) is preferably a 3,4-diacyloxy-1-butene, in which $R^1$ to $R^4$ are hydrogen atoms, X is a single bond, $R^7$ and $R^8$ are $R^9$—CO—, and $R^9$ is an alkyl group having 1 to 4 carbon atoms. Of these, 3,4-diacetoxy-1-butene, in which $R^9$ is a methyl group, is particularly preferably used.

The PVA-based resin used in the invention may be one kind or a mixture of two or more kinds. Examples of the case using two or more kinds of PVA-based resin include: a combination of two or more kinds of unmodified PVA-based resin which differ in average particle diameter, degree of saponification, average degree of polymerization, melting point and the like; a combination of an unmodified PVA-based resin and a modified PVA-based resin; a combination of two or more kinds of modified PVA-based resin which differ in average particle diameter, degree of saponification, average degree of polymerization, melting point, kinds of functional groups, modification rate and the like; and the like.

[Diverting Agent]

The diverting agent of the invention contains the PVA-based resin powder having an average particle diameter of 800 to 2000 μm. The amount of the PVA-based resin powder having an average particle diameter of 800 to 2000 μm, based on the entire diverting agent, is preferably 10 to 100 mass %, more preferably 30 to 100 mass %, further preferably 50 to 100 mass %. When the amount is too low, there is a tendency towards difficulty in obtaining the effects of the invention.

In addition to the PVA-based resin powder having an average particle diameter of 800 to 2000 μm, an additive material (additive) such as sand, iron, ceramic and other biodegradable resins (for example, PVA-based resins having an average particle diameter of less than 800 μm, melt-formed pellets of a PVA-based resin, PLA in pallets or powder, PGA in pellets or powder and the like) can be blended in the diverting agent of the invention as long as the effects of the invention are not impaired.

The amount of the additive material (additive) blended is preferably 50 mass % or less, more preferably 20 mass % or less, further preferably 10 mass % or less based on the entire diverting agent.

The diverting agent can be produced by uniformly mixing the PVA-based resin powder having an average particle diameter of 800 to 2000 μm and other additive materials (additives) when necessary.

When a hydraulic fracturing method is used in excavating oil, natural gas or the like, the diverting agent of the invention enters into a fracture or a fissure generated in a well and can temporarily fill the fracture or the fissure. Because the diverting agent of the invention contains PVA-based resin powder having an average particle diameter of 800 to 2000 μm, the diverting agent does not easily dissolve and exhibits excellent capability of filling at an early stage of filling of the fracture or the fissure and exhibits excellent solubility after a certain period of time. Thus, a new fracture or fissure can be generated while the fracture is temporarily filled with the diverting agent of the invention. As a method of filling a fracture or a fissure, the diverting agent of the invention is allowed to flow into a fracture with a flow of fluid in the well. As a result, the fracture to be filled can be temporarily plugged.

Further, since the diverting agent of the invention is water-soluble and biodegradable, the diverting agent is rapidly dissolved in water and removed after use and is then biodegraded. Therefore, environmental load is small, and the diverting agent is very useful.

EXAMPLES

Hereinafter, the invention will be explained further specifically referring to Examples and Comparative Examples, but the invention is not limited to the Examples. In the Examples and the Comparative Examples below, "parts" and "%" are mass basis unless otherwise specified.

Test Example 1

Example 1

A diverting agent containing the following powdery PVA-based resin particles (PVA 1) was produced.

To a reaction can equipped with a reflux condenser, a dropping device and a stirrer, 20 parts of vinyl acetate (20% of the total was used for initial charge), 18 parts of methanol and 0.6 parts of 3,4-diacetoxy-1-butene (20% of the total was used for initial charge) were charged, and the temperature was raised under a nitrogen stream while stirring. After reaching the boiling point, 0.093 parts of acetyl peroxide were charged, and polymerization was started.

After 0.5 hours from the start of polymerization, 80 parts of vinyl acetate and 2.4 parts of 3,4-diacetoxy-1-butene were added dropwise at a constant speed over 8.5 hours. When the polymerization rate of vinyl acetate became 96%, a predetermined amount of hydroquinone monomethyl ether was added to complete the polymerization. Then, unreacted vinyl acetate monomer was removed out of the system through distillation while blowing methanol vapor, and a methanol solution of the copolymer was thus obtained.

Then, the solution was diluted with methanol, and the solid content concentration was adjusted to 55%. Saponification was performed by adding a methanol solution of 2% sodium hydroxide (in terms of sodium) at a ratio of 15 mmol with respect to 1 mol of the total amount of the vinyl acetate structural unit and the 3,4-diacetoxy-1-butene structural unit in the copolymer while maintaining the solution temperature at 45° C. When the saponified product precipitated in a filter cake as the saponification proceeded, the filter cake was moved on a belt and pulverized. Then, acetic acid for neutralization was added at 0.3 equivalents per 1 equivalent of sodium hydroxide, and modified PVA-based resin particles containing a side-chain 1,2-diol structural unit (side-chain 1,2-diol structural unit-containing modified PVA-based resin particles) (PVA 1) were obtained by filtering, washing well with methanol and drying in a hot air drier.

Obtained PVA 1 was powder. PVA 1 was sieved by a dry sieving test method, and the particle diameter at which the integrated value was 50% was calculated. The average particle diameter of PVA 1 was 899 μm.

The degree of saponification of PVA 1, which was analyzed with the amount of alkali consumption required for hydrolysis of the structural units of the remaining vinyl acetate and 3,4-diacetoxy-1-butene in the resin, was 99.3 mol %. The average degree of polymerization, which was analyzed in accordance with JIS K 6726:1994, was 600.

The amount of the 1,2-diol structural unit represented by the above formula (1) in PVA 1 (modification rate), which was calculated from the integrated value measured by $^1$H-NMR (300 MHz proton NMR, $d_6$-DMSO solution, internal standard substance; tetramethylsilane, 50° C.), was 1.5 mol %.

Example 2

Side-chain 1,2-diol structural unit-containing modified PVA-based resin particles (PVA 2) were obtained by the same method as that of Example 1 except that the belt speed for moving the filter cake of the PVA-based resin on a belt was made 1.2 times higher in the method of Example 1.

Obtained PVA 2 was powder and had an average particle diameter of 980 μm, a saponification degree of 99.3 mol %, an average degree of polymerization of 600 and a modification rate of 1.5 mol %.

Example 3

Side-chain 1,2-diol structural unit-containing modified PVA-based resin particles (PVA 3) were obtained by the same method as that of Example 1 except that the saponification was performed by adding a methanol solution of 2% sodium hydroxide (in terms of sodium) at a ratio of 16 mmol with respect to 1 mol of the total amount of the vinyl acetate structural unit and the 3,4-diacetoxy-1-butene structural unit in the method of Example 1.

Obtained PVA 3 was powder and had an average particle diameter of 1100 μm, a saponification degree of 99.4 mol %, an average degree of polymerization of 600 and a modification rate of 1.5 mol %.

Example 4

Side-chain 1,2-diol structural unit-containing modified PVA-based resin particles (PVA 4) were obtained by the same method as that of Example 1 except for the following points in the method of Example 1: 100 parts of vinyl acetate, 32.5 parts of methanol and 2 parts of 3,4-diacetoxy-1-butene were charged; the polymerization was completed when the polymerization rate became 92% in the polymerization reaction; the saponification was performed by adding a methanol solution of 2% sodium hydroxide (in terms of sodium) at a ratio of 12 mmol with respect to 1 mol of the total amount of the vinyl acetate structural unit and the 3,4-diacetoxy-1-butene structural unit; and the obtained resin was sieved through a mesh having an opening of 850 μm after the pulverization of the filter cake to remove those having small particle diameters.

Obtained PVA 4 was powder and had an average particle diameter of 903 μm, a saponification degree of 98.5 mol %, an average degree of polymerization of 450 and a modification rate of 1.0 mol %.

Comparative Example 1

Side-chain 1,2-diol structural unit-containing modified PVA-based resin particles (PVA 5) were obtained by further pulverizing PVA 1 obtained in Example 1.

Obtained PVA 5 was powder and had an average particle diameter of 679 μm, a saponification degree of 99.3 mol %, an average degree of polymerization of 600 and a modification rate of 1.5 mol %.

Comparative Example 2

Side-chain 1,2-diol structural unit-containing modified PVA-based resin particles (PVA 6) were obtained by the same method as that of Example 4 except that sieving through a mesh having an opening of 850 μm was not conducted in the method of Example 4.

Obtained PVA 6 was powder and had an average particle diameter of 751 μm, a saponification degree of 98.5 mol %, an average degree of polymerization of 450 and a modification rate of 1.0 mol %.

<Measurement of Residual Rates of PVA-Based Resins>

The solubility in water (residual rates) of each example was measured.

(1) Residual Rate at 23° C. after 1 Hour

A 140 mL glass container with a lid containing 100 g of water was placed in a thermostatic chamber, and the water temperature was set to 23° C. The long sides of 120 mesh (opening 125 μm, 10 cm×7 cm) made of nylon were folded in half, and both ends were heat-sealed to obtain a mesh bag (5 cm×7 cm).

One gram of PVA-based resin particles was put into the obtained mesh bag, and the opening was heat-sealed. A mesh bag containing the PVA-based resin was thus obtained, and the mass was measured. The mesh bag containing the PVA-based resin was immersed in the glass container. The mesh bag containing the PVA-based resin was taken out from the glass container after standing still for an hour in the thermostatic chamber at 23° C. and dried at 140° C. for three hours. Then, the mass of the mesh bag containing the PVA-based resin was measured. The mass of the PVA-based resin remaining in the mesh bag was calculated from the mass before immersion, and the residual rate of the PVA-based resin after an hour was calculated by the following formula. The results are shown in Table 1.

In the following formula, the solid fraction (mass %) of the PVA-based resin can be calculated by drying the PVA-based resin at 105° C. for three hours and measuring the mass of the PVA-based resin before and after drying.

Residual rate (%)={weight of PVA-based resin residue after drying (g)/(initial weight of PVA-based resin (g)×solid fraction of PVA-based resin (mass %)/100)}×100

(2) Residual Rate at 40° C. after 7 Days

The residual rates of the PVA-based resins after seven days were calculated by the method described in (1) above in which the water temperature of the thermostatic chamber was changed to 40° C. The results are shown in Table 1.

Test Example 2

(Production of Columnar PVA-Based Resin Particles (PVA 7))

Side-chain 1,2-diol structural unit-containing modified PVA-based resin particles were obtained by the same method as that of Example 1 except that 100 parts of vinyl acetate, 32.5 parts of methanol and 4 parts of 3,4-diacetoxy-1-butene were charged and that the polymerization was completed when the polymerization rate of vinyl acetate became 91% in the polymerization reaction in the method of Example 1.

The obtained side-chain 1,2-diol structural unit-containing modified PVA-based resin particles had a saponification degree of 98.5 mol %, an average degree of polymerization of 530 and a modification rate of 2.0 mol %.

The side-chain 1,2-diol structural unit-containing modified PVA-based resin particles obtained above were charged into an extruder, melt-kneaded under the following conditions after further mixing with 500 ppm of magnesium stearate and 500 ppm of magnesium 12-hydroxystearate, solidified by air cooling and then cut using a cutter (strand cutting style). Then, after drying, columnar side-chain 1,2-diol structural unit-containing modified PVA-based resin particles (PVA 7) having a diameter of 2.5 mm and a length in the axial direction of 3 mm were obtained.

(Melt-Kneading Conditions)

Extruder: manufactured by Technovel Corporation, 15 mmφ, L/D=60

Rotational speed: 200 rpm

Discharge amount: 1.2 to 1.5 kg/h

Extrusion temperature: C1/C2/C3/C4/C5/C6/C7/C8/D=90/170/200/215/215/220/225/225/225° C.

<Pressurized Dehydration Test>

In accordance with the compositions shown in Table 2 below, PVAs 1 to 6 and PVA 7 were mixed, and particle mixtures 1 to 6 were obtained.

TABLE 1

| | PVA No. | Saponification Degree mol % | Average Polymerization Degree | Modification Modifying Kind | Rate mol % | Average Particle Diameter μm | Residual Rate (mass %) 23° C., 1 hr | Residual Rate (mass %) 40° C., 7 days |
|---|---|---|---|---|---|---|---|---|
| Example 1 | PVA1 | 99.3 | 600 | 1,2-diol | 1.5 | 899 | 52.7 | 3.6 |
| Example 2 | PVA2 | 99.3 | 600 | 1,2-diol | 1.5 | 980 | 54.9 | 5.6 |
| Example 3 | PVA3 | 99.4 | 600 | 1,2-diol | 1.5 | 1100 | 58.2 | 6.4 |
| Example 4 | PVA4 | 98.5 | 450 | 1,2-diol | 1.0 | 903 | 50.7 | 3.9 |
| Comparative Example 1 | PVA5 | 99.3 | 600 | 1,2-diol | 1.5 | 679 | 47.6 | 6.5 |
| Comparative Example 2 | PVA6 | 98.5 | 450 | 1,2-diol | 1.0 | 751 | 41 | 7 |

From the results of Table 1, the residual rates of the PVA-based resins of Examples 1 to 4 after immersion in water at 23° C. for an hour were 50 mass % or more, and the residual rates after immersion at 40° C. for seven days were 10 mass % or less. From the results, it was found that while Examples 1 to 4 had low initial solubility after addition to water and excellent capability of filling gaps such as fractures, the later solubility thereof was also excellent. It was thus found that the PVA-based resins have sufficient filling capability and rapid solubility when fractures in a well are filled.

The dehydration amounts of dispersing liquids obtained by dispersing the particle mixtures were measured using a high-pressure dehydrator "HPHT Filter Press 500CT" of Fann Instrument Company.

The particle mixtures were added to a 0.48 mass % aqueous solution of guar gum, and mixture solutions in which the concentrations of the particle mixtures were 12 mass % were prepared. The mixture solutions were dispersed by stirring at 23° C. for 60 minutes, and dispersing liquids were obtained.

Next, the width of the water discharge part slit of the high-pressure dehydrator was set at 2 mm, and the dispersing liquids were subjected to pressurized dehydration by applying pressure of 1 MPa.

The dehydration amounts were measured every 0.5 minutes after starting the pressurization (0 minute) to five minutes, and the integrated dehydration amounts y to the square root of time x were determined. From the scatter plots obtained by plotting on graphs with the square root of time x plotted along the horizontal axis and the integrated dehydration amount y plotted along the vertical axis, the regression lines represented by the following formula (A) were calculated by the least squares method. The filling periods can be evaluated to be lasting when a in the formula (A) is 80 or less. The results are shown in Table 2.

$$y=ax+b \quad (A)$$

(In the formula (A), y is the integrated dehydration amount (g), and x is the square root of time (minute) after starting pressurization. a and b are the slope and the intercept of the regression line, and 0<x≤2.)

TABLE 2

| | Composition of Particles | | | | Slope (a) of Formula (A) | Intercept (b) of Formula (A) |
|---|---|---|---|---|---|---|
| | PVA No. | mass % | PVA No. | mass % | | |
| Particle Mixture 1 | PVA1 | 70 | PVA7 | 30 | 17.0 | 119 |
| Particle Mixture 2 | PVA2 | 70 | PVA7 | 30 | 11.6 | 109 |
| Particle Mixture 3 | PVA3 | 70 | PVA7 | 30 | 17.8 | 37 |
| Particle Mixture 4 | PVA4 | 70 | PVA7 | 30 | 18.5 | 141 |
| Particle Mixture 5 | PVA5 | 70 | PVA7 | 30 | 4.9 | 295 |
| Particle Mixture 6 | PVA6 | 70 | PVA7 | 30 | 5.5 | 288 |

From the results in Table 2, the particle mixtures 1 to 4 containing the PVA-based resin particles of Examples 1 to 4 had smaller intercepts b of the formula (A) and larger slopes a compared to those of the particle mixtures 5 and 6. From the results, it was found that the particle mixtures 1 to 4 containing the PVA-based resin particles of Examples 1 to 4 have high capability of filling at an early stage of pressurization and can rapidly release the filling state.

While the invention has been explained in detail referring to specific embodiments, it will be apparent to one skilled in the art that various changes and modifications can be made therein without departing from the spirit and scope of the invention. This application is based on a Japanese Patent Application filed on Feb. 13, 2019 (Patent Application No. 2019-023949), the contents of which are incorporated herein by reference.

The invention claimed is:

1. A diverting agent, comprising:
powdery polyvinyl alcohol-based resins having an average particle diameter of 800 to 2000 μm, wherein:
when 1 g of the polyvinyl alcohol-based resin is immersed in 100 g of water at 23° C. for an hour, the residual rate of the polyvinyl alcohol-based resin is 50 mass % or more, and
when 1 g of the polyvinyl alcohol-based resin is immersed in 100 g of water at 40° C. for seven days, the residual rate of the polyvinyl alcohol-based resin is 10 mass % or less.

2. The diverting agent according to claim 1, wherein the degree of saponification of the polyvinyl alcohol-based resin is 90 to 100 mol %.

3. The diverting agent according to claim 1, wherein the polyvinyl alcohol-based resin is a polyvinyl alcohol-based resin having a hydrophilic modifying group.

4. A method of filling a fracture in a well which is a method of temporarily filling the fracture generated in the well, comprising:
allowing the diverting agent according to claim 1 to flow into the fracture with a flow of fluid in the well.

5. The method of claim 4, wherein the fracture has a temperature of 40-60° C.

6. The diverting agent of claim 1, wherein the powdery polyvinyl alcohol-based resins have an average degree of polymerization of 200 to 3000 when measured in accordance with JIS K 6726: 1994.

* * * * *